(12) United States Patent
Ebisuzaki et al.

(10) Patent No.: US 7,558,943 B2
(45) Date of Patent: Jul. 7, 2009

(54) PROCESSING UNIT FOR BROADCAST PARALLEL PROCESSING

(75) Inventors: Toshikazu Ebisuzaki, Wako (JP); Jun-ichiro Makino, Wako (JP)

(73) Assignee: Riken, Saitama (JP)

( * ) Notice: Subject to any disclaimer, the term of this patent is extended or adjusted under 35 U.S.C. 154(b) by 430 days.

(21) Appl. No.: 11/189,186

(22) Filed: Jul. 26, 2005

(65) Prior Publication Data
US 2006/0020770 A1    Jan. 26, 2006

(30) Foreign Application Priority Data
Jul. 26, 2004    (JP)    ............ 2004-216728

(51) Int. Cl.
G06F 15/00    (2006.01)
G06F 15/76    (2006.01)
(52) U.S. Cl. .................................................. 712/10
(58) Field of Classification Search .................. 712/10
See application file for complete search history.

(56) References Cited

U.S. PATENT DOCUMENTS

| | | | | | |
|---|---|---|---|---|---|
| 4,992,933 | A | * | 2/1991 | Taylor ................................ | 712/22 |
| 5,680,597 | A | * | 10/1997 | Kumar et al. ...................... | 712/226 |
| 5,729,758 | A | * | 3/1998 | Inoue et al. ........................ | 712/22 |
| 5,765,011 | A | * | 6/1998 | Wilkinson et al. ................. | 712/20 |
| 5,794,059 | A | * | 8/1998 | Barker et al. ...................... | 712/10 |
| 6,145,072 | A | * | 11/2000 | Shams et al. ...................... | 712/22 |
| 6,173,386 | B1 | * | 1/2001 | Key et al. ........................... | 712/10 |
| 6,606,699 | B2 | * | 8/2003 | Pechanek et al. ................. | 712/16 |
| 7,191,310 | B2 | * | 3/2007 | Yamaura et al. .................. | 712/10 |
| 2005/0108720 | A1 | * | 5/2005 | Cervini ............................... | 718/105 |

FOREIGN PATENT DOCUMENTS

| | | |
|---|---|---|
| JP | 61-035645 | 2/1986 |
| JP | 05-174166 | 7/1993 |
| JP | 08-161165 | 6/1996 |

OTHER PUBLICATIONS

Makino, Junichiro et al. *HARP: A Special-Purpose Computer for N-Body Problem*, Publ. Astron. Soc. Japan 45, 349-360 (1993).
Office Action for JP 2004-216728, pp. 1-3, dated Mar. 17, 2009 (along with English translation of same, pp. 1-2).

* cited by examiner

*Primary Examiner*—Eddie P Chan
*Assistant Examiner*—Corey S Faherty
(74) *Attorney, Agent, or Firm*—Alston & Bird LLP

(57) ABSTRACT

A processing unit includes a control processor and a plurality of element processors having register files. At least two of the element processors pre-receive different parameters, store the parameter data in the register files, receive the same memory address and the same instruction broadcast by the control processor, read the same data from the external memory via a memory port based on the memory address, and perform at least one of logic computation and arithmetic computation for the same data in accordance with the same instruction and based on the different parameters.

8 Claims, 4 Drawing Sheets

PROCESSING UNIT FOR BROADCAST PARALLEL PROCESSING

BACKGROUND OF THE INVENTION

1. Field of the Invention

The present invention relates to processing units for computers. In particular, the present invention relates to a processing unit that performs numerical computation, such as a floating point operation.

2. Description of the Related Art

Conventionally, computers having higher processing speed have been demanded. In particular, in the field of scientific and engineering simulations that involve a large computational load, processing units that perform numerical computation at high speed have been demanded.

Most conventional computers have an architecture called von Neumann architecture (or, stored-program architecture). In von Neumann architecture, the bandwidth (the transfer rate) between the central processing unit (CPU) and the memory limits the computational processing performance. This limitation is called the von Neumann bottleneck. In current semiconductor-process technology, it is difficult to integrate CPUs and memories because combination of manufacturing process of CPU with that of the memory is not realized. Thus, CPUs and memories are typically implemented in separate semiconductor integrated circuits and the influence of the bandwidth between the CPUs and the memories on the computational speed has become significant. Accordingly, attempts are being made to overcome the von Neumann bottleneck.

In order to overcome the von Neumann bottleneck, the present inventors developed a computer system, called GRAPE (GRAvity PipE), in which a special-purpose computing unit, or dedicated computing unit is connected to a general-purpose host computer to perform high-computational-load processing. GRAPE has a dedicated computing unit that performs computation dedicated to particle simulation. The dedicated computing unit includes a semiconductor chip having a large number of pipelines that employ hardware to achieve computational operations for efficient calculation of interaction between particles. The dedicated computing unit has a memory unit shared by the large number of pipelines. As a result of this architecture, in spite of its relatively small circuit scale, the GRAPE exhibits greater computational processing performance than some supercomputers (e.g., refer to J. Makino, E. Kokubo, and M. Taiji, "HARP: A Special-purpose Computer for N-body Simulations", publication of the Astronomical Society of Japan, 45, pp. 349-360, (1993)).

Another example of available computers for overcoming the von Neumann bottleneck is a reconfigurable computer (RC) which employs FPGAs (field programmable gate arrays). The computer-system architecture in which an RC is used to perform high-speed numerical computations is similar to the GRAPE architecture and employs a host computer and an FPGA board. An external memory and an FPGA network that comprises FPGAs are mounted on the FPGA board.

In addition, an SIMD (single instruction, multiple data) massively parallel computer may also be used for efficiently performing numerical computations. In SIMD massively parallel computers, multiple processor chips are used, and processor units, each having a local memory and a register file, are integrated into each processor chip (refer to Japanese Patent Provisional Publication No. 5-174166).

The GRAPE computer may perform an intended computation at high speed, but processible computations are specified at the stage when the pipeline implementation into hardware is determined. Thus, the GRAPE computer lacks versatility.

The RCs also have some problems, however. Specifically, since FPGAs used are designed to be reconfigurable, the circuit scale of RC is limited. Also, the operating speed cannot be increased as compared to other processors. Further, when the RC is used to perform double-precision floating-point operations used in typical numerical computation, the computing speed decreases. Consequently, the RC may be used for high-speed computation only when low computational accuracy (e.g., numerical computations for fixed point operations) is allowable. In addition, in order for the RC to perform an intended computation, for example, the user needs to configure the FPGAs by programming near-hardware level language, such as VHDL (Vhsic Hardware Description Language), thereby making it difficult for the user to develop an application.

With the SIMD massively parallel computer, when an attempt is made to integrate a large number of processor units into a single chip, the memory bandwidth becomes relatively insufficient, and thus, a limitation similar to the von Neumann bottleneck occurs. Therefore, there is continuing limitation in that, even as the semiconductor manufacturing technology advances, the integration of the processor units cannot be increased in proportion to such progress.

SUMMARY OF THE INVENTION

Accordingly, an object of the present invention is to overcome at least some of the problems described above.

The present invention provides a processing unit. The processing unit includes a plurality of element processors capable of communicating with an external memory via the same memory port, each element processor having a logic unit, an arithmetic unit, and a register file; and a control processor for sending instructions and addresses to the plurality of element processors to operate the plurality of element processors. At least two of the plurality of element processors pre-receive different parameter data to be used for the operation; store the parameter data in the corresponding register files; receive the same instruction that has been broadcast, for the operation, by the control processor; read the same data from the external memory via the memory port; and perform at least one of logic computation and arithmetic computation in accordance with the same instruction, with respect to the same data and the different parameter data.

In the processing unit described above, preferably, the data includes 72-bit-length floating-point-format data containing a 1-bit sign field, an 11-bit exponent field, and a 60-bit mantissa field. The instruction may include a multiplication instruction, including a single-precision multiplication instruction and a double-precision multiplication instruction, and an addition/subtraction instruction, including a regular floating-point addition/subtraction instruction and a block floating-point addition/subtraction instruction containing a mode bit. The arithmetic units may include multipliers and adders.

Preferably, each multiplier corrects a bias of a mantissa of input data when receiving the input data. Preferably, in response to the single-precision multiplication instruction, each multiplier performs a rounding operation on a computational result of a multiplication to thereby provide a 25-bit result. Preferably, in response to the double-precision multiplication instruction, each multiplier does not perform a rounding operation on a computational result of a multiplication. Preferably, in response to the regular floating-point addition/subtraction instruction, each adder performs computation by performing a rounding operation on a computational result. Preferably, in response to the block floating-point addition/subtraction instruction, each adder performs computation by shifting, in accordance with an exponent of an input that corresponds to a source operand specified by the mode bit of inputs designated by operands of at least two floating-point data for computation, an exponent of another source operand, and does not normalize a computational result.

In the processing unit of the present invention, using the same data and different parameter data, the plurality of element processors may perform computations in accordance with the same instruction. Thus, the computational processing speed may be increased without the problem of the memory bandwidth.

DESCRIPTION OF THE PREFERRED EMBODIMENT

An embodiment of the present invention will be described below with reference to the accompanying drawings.

Overall Structure

Figure 1:
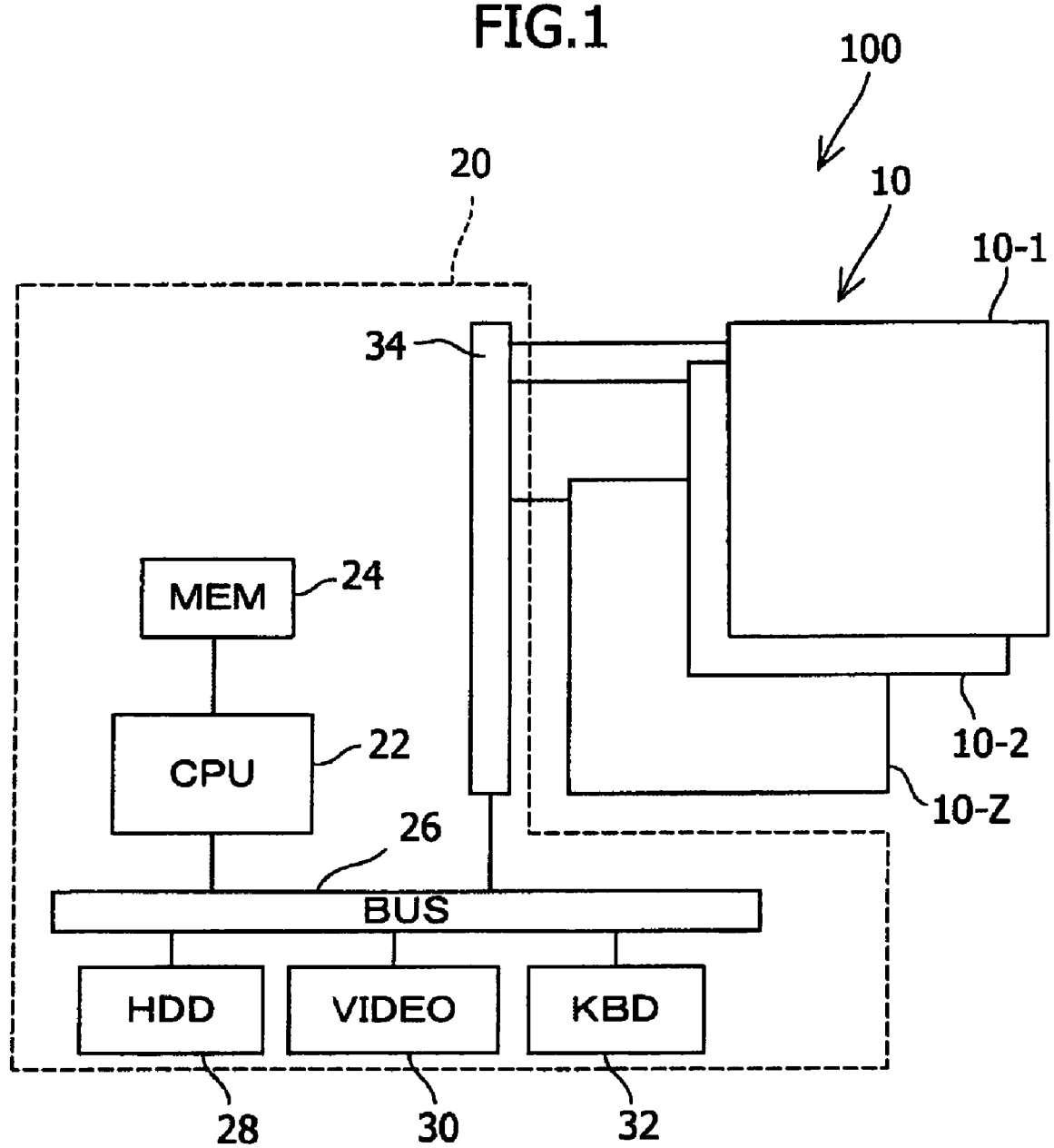
FIG. 1 is a block diagram showing the configuration of a computer system according to an embodiment of the present invention.

FIG. 1 is a block diagram showing the structure of a computer system 100 for performing computation using a processing unit according to an embodiment of the present invention. The computer system 100 can include a host computer 20 and a dedicated computing unit 10. The host computer 20 may be implemented with, for example, a commercially available personal computer. A primary storage device (memory) 24 is connected to a central processing unit (CPU) 22. For example, an auxiliary storage device 28 such as a hard disk drive, displaying means 30 such as a display adapter, and input operating means 32 such as a keyboard and/or a mouse are connected to the CPU 22 via an appropriate bus 26 compliant with an appropriate standard, such as the PCI (Peripheral Component Interconnect) or ISA (Industrial Standard Architecture) standard. The dedicated computing unit 10 is connected to the bus 26 via appropriate communicating or inputting/outputting means 34 (e.g., a PCI bus slot or an appropriate I/O (input/output) card connected to a PCI bus). The host computer 20 controls the dedicated computing unit 10, which includes a processing unit described below, to thereby cause the computer system 100 to execute an intended computation.

The dedicated computing unit 10 may be implemented with, for example, a plurality of adapter cards 10-1 to 10-Z (Z is a natural number). Alternatively, for example, the dedicated computing unit 10 may be implemented with a single adapter card, or may be stored in an appropriate housing and be connected with the host computer 20 via appropriate communicating means.

Adapter Card

Figure 2:
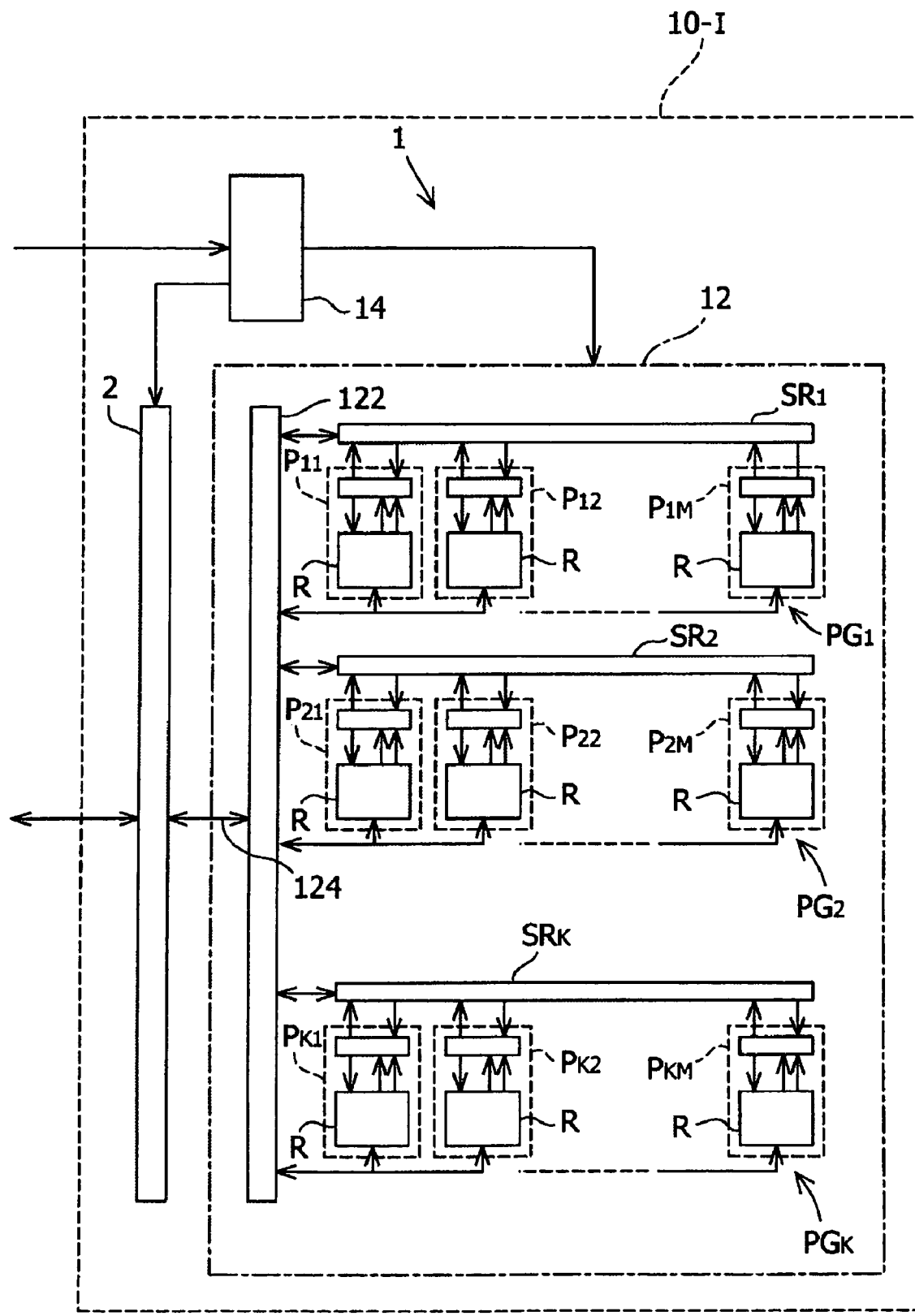
FIG. 2 is a block diagram showing the configuration of adapter cards of a dedicated computing unit in the embodiment of the present invention.

FIG. 2 shows the structure of one adapter card in the present embodiment. The adapter card 10-I (I is a natural number from 1 to Z) has a configuration in which a processing unit 1 according to the embodiment of the present invention and an external memory 2 are interconnected via an appropriate external bus interface 122. The external memory 2 may be an arbitrary memory and, for example, is appropriately selected from random access memories (RAMs) based on various systems, in accordance with the storage capacity and the data transfer rate. Although only one external memory 2 is illustrated in FIG. 2, the external memory 2 may be divided into a memory for data and a memory for instructions. The external memory 2 and the external bus interface 122 are interconnected via an external bus 124. The external bus interface 122 can access the external memory 2 via the memory port of the external memory 2. Thus, a plurality of element processors $P_{11}$ to $P_{KM}$ can access the external memory 2 via the same memory port of the external memory 2.

Processing Unit

The processing unit 1 has an integrated circuit in which circuits are integrated on a single semiconductor die 12. The die 12 is provided with K×M element processors $P_{11}$ to $P_{KM}$ (K and M are natural numbers). Each element processor includes a register file R. In such a case, if, for example, both K and M are 16, then 256 element processors are integrated on the semiconductor die 12. Although only one semiconductor die 12 is provided on the adapter card 10-I illustrated in FIG. 2, a plurality of semiconductor dies 12 may be provided on the adapter card 10-I.

The element processors $P_{11}$ to $P_{KM}$ are grouped into K processor groups $PG_1$ to $PG_K$, which include element processors ($P_{11}$ to $P_{1M}$) to ($P_{K1}$ to $P_{KM}$), respectively. The processor groups $PG_1$ to $PG_K$ are provided with shared register files $SR_1$ to $SR_K$, respectively.

A control processor 14 is controlled by the host computer 20 via the appropriate communicating or inputting/outputting means 34 (FIG. 1) to send instructions for operating the element processors $P_{11}$ to $P_{KM}$ to the respective element processors and also to send memory addresses of the external memory 2. Data used for computation is written from the host computer 20 into the external memory 2. Although the control processor 14 and the semiconductor die 12 are illustrated in FIG. 2 as being separate components, both of them may be integrated on the semiconductor die 12.

The register files R are used for computation by the element processors $P_{11}$ to $P_{KM}$. Each element processor is provided with a logic unit and an arithmetic unit, which is not shown.

The operation of the processing unit 1 of the present embodiment will be described next.

Operations

One feature of the operation of the processing unit 1 is that the individual element processors $P_{11}$ to $P_{KM}$ process the same data in parallel in accordance with the same instruction. In this case, parameter data corresponding to the purpose of computation is pre-transferred to the register file R of each element processor. Each element processor uses the parameter data and the same data as data for the other element processors to perform computation corresponding to the same instruction. The parameter data are data supplied to the respective element processors $P_{11}$ to $P_{KM}$ so that the entire dedicated computing unit 10 performs the intended computation. Typically, the parameter data are different from one another depending on the element processors $P_{11}$ to $P_{KM}$. Thus, even when the individual element processors $P_{11}$ to $P_{KM}$ perform computations on the same data in accordance with the same instruction, the computational results typically differ from one another depending on the element processors $P_{11}$ to $P_{KM}$. The term "same instruction" used herein refers to an instruction having, at least, the same mnemonic (opcode). That is, the same instruction refers to, for example, an instruction having the same mnemonic and having an operand specifying the same register, or an instruction having the same mnemonic and having an operand specifying a different register. In this case, since different data are typically stored in the registers of the element processors $P_{11}$ to $P_{KM}$, different computational results are generally provided even if the types of computations are the same.

Changing Operations of Processing Unit according to Instruction

Each element processor performs computation with respect to the register file R and/or the shared register file SR in accordance with an instruction and stores the result in the memory. Some numerical calculations can be performed using almost only the register files R in the element processors $P_{11}$ to $P_{KM}$ without a need to access the external memory 2. Examples of such calculations include, but are not limited to, calculation of the gravity or the like of numerous particles, which calculation was conventionally performed by the GRAPE computer of the related art, or numerical calculation of the product of large-scale matrices. In the present invention, the processing of the element processors $P_{11}$ to $P_{KM}$ in the processing unit 1 is controlled by instructions based on a program. Thus, when a program that causes the dedicated computing unit 10 to perform an appropriate operation corresponding to processing is created, the use of the same hardware configuration allows multiple types of computation to be performed at high speed. For example, merely modifying the program allows the same hardware configuration to perform, for example, the computation of the gravity or the like of numerous particles or the computation of a matrix product.

Grouping of Element Processors

The multiple element processors can be grouped. Referring to FIG. 2, the element processors $P_{11}$ to $P_{KM}$ are grouped into the processor groups $PG_1$ to $PG_K$, which are provided with the shared register files $SR_1$ to $SR_K$, respectively. The shared register files $SR_1$ to $SR_K$ are accessible from the element processors $P_{11}$ to $P_{KM}$ in the corresponding groups, respectively. The use of the register files $SR_1$ to $SR_K$ allows data computed by one element processor in a group to be referred to by another element processor without access to the external memory 2.

Mode for Transfer between External Memory and Element Processor

The processing unit 1 of the present embodiment has various modes for transfer between the external memory 2 and the register files R of the element processors or the shared register files SR for the processor groups. A mode for writing from the external memory 2 into the register files R of the element processors includes a mode for broadcasting to multiple element processors and a mode for randomly accessing an individual element processor. Further, a mode for reading from the register files R to the external memory 2 includes a mode for randomly accessing an individual element processor. When the element processors are grouped, at least one of a mode for reading from the shared memory to the external memory 2 and a mode for writing from the external memory 2 into the shared memory includes a mode for broadcasting to multiple element processors and a mode for randomly accessing and transferring to an individual element processor. In this case, the mode for writing from the external memory 2 into the register files R further includes a mode for broadcasting to all element processors in a group and a mode for broadcasting to element processors in multiple groups, and the mode for reading from the register files R to the external memory 2 further includes a reading mode that involves reduction in a group.

Vector Instruction

The processing unit 1 of the present embodiment can have a vector instruction. The use of a vector instruction allows the same instruction to be executed with respect to a combination of a large number of operands. This can reduce the bandwidth required for broadcasting an instruction in the processing unit 1 of the present embodiment in which the multiple element processors $P_{11}$ to $P_{KM}$ perform computation in parallel. In the processing unit 1 of the present embodiment, various changes can be made to the vector length (i.e., the instruction length) of the vector instruction. An operand for directly or indirectly specifying the vector length can be contained in the vector instruction. This allows for flexible selection of a vector length suitable for the intended computation.

Indirect Addressing

In the processing unit 1 of the present embodiment, indirect addressing employing address offset can be used. The use of indirect addressing allows for computation with piecewise polynomials, thus making it possible to perform numerical computation for a power function, an elementary function, or the like.

Data Structure

Typically, when floating-point summation is performed, the result varies depending on the computation sequence. To overcome this problem, the processing unit 1 of the present embodiment can perform summation using an approach in which the computation can be virtually performed as fixed-point computation. That is, floating-point addition that does not involve normalization of a computational result is incorporated in the present embodiment. The exponent of accumulators provided for the element processors is set to have a value greater than values that can appear during summation. With this arrangement, when computation that does not involve post-summation normalization is performed, the summation result does not depend on the summation sequence. To allow such a computation, a flag (mode bit) specifying which source-operand exponent is to be used can be provided in the present embodiment.

To overcome the above-described problem, 72-bit numeric data having a 1-bit sign field, an 11-bit exponent field, and a 60-bit mantissa field can be handled in the present embodiment. In floating-point computation that does not involve post-computation normalization, a 60-bit mantissa field is used, rather than using a 52-bit mantissa field as specified by the IEEE-754 standard that expresses 64-bit double-precision data by using a 1-bit sign field, an 11-bit exponent field, and a 52-bit mantissa field. This scheme in the present embodiment prevents a decrease in the accuracy of double-precision computation when normalization is not performed. In this case, for single-precision computation, computation is performed after the mantissa is rounded and the result is forcibly rounded to 1 and is converted into 25 bits. The result is then stored in the memory with the unreduced mantissa field. A form using an exponent-field implicit bit (a hidden bit) as used in IEEE 754, or the so-called "economized form," is not employed in the present embodiment.

When double-precision multiplication is performed in the present embodiment, single-precision multipliers can be used to perform the computation. This can be achieved by providing a multiplication instruction after shifting the mantissa. Since all bits of the result of the multiplication are essentially stored in the registers, the double-precision multiplication can be accomplished by determining partial products and then adding the partial products.

Logic Unit

While primary computation performed by the processing unit 1 of the present embodiment is numerical computation, logic units can be used to perform various types of conditional processing. The logical structure of the logic units for addition or subtraction is analogous to that of known ALUs (arithmetic logic units).

Pipeline Implementation

Pipelines can be used for arithmetic units in the element processors $P_{11}$ to $P_{KM}$ in the processing unit 1 of the present embodiment. Multiple element processors can also be integrated into one pipeline. Such implementation using the pipeline(s) further improves the computational processing efficiency of the processing unit 1 of the present embodiment with reduced memory access.

A specific example when the processing unit 1 of the present embodiment performs various computations will be described below.

FIRST EXAMPLE

Inter-particle Interaction due to Gravitational and Coulomb Forces

Figure 3:
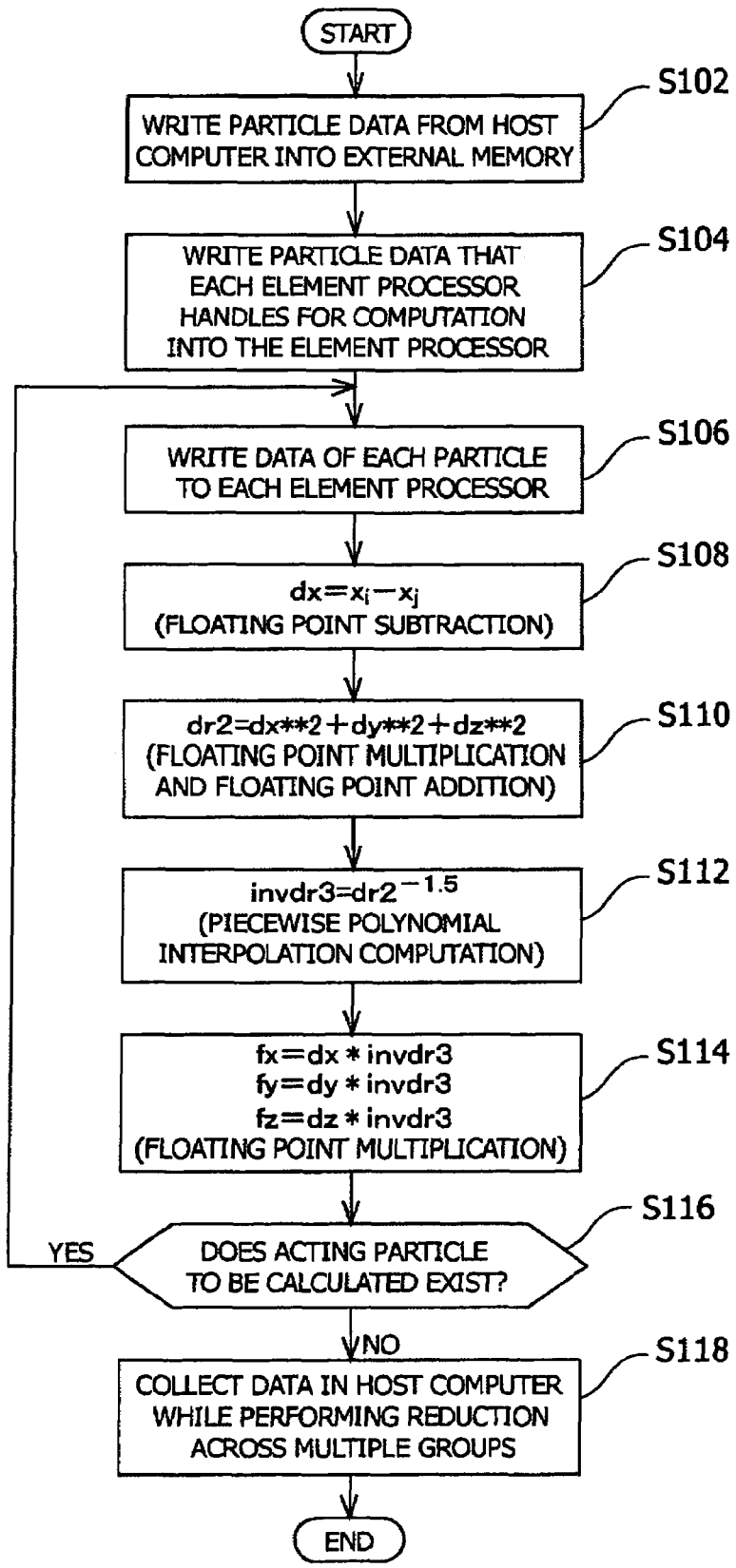
FIG. 3 is a flow chart showing processing according to a first example in the present invention.

An operation, using the processing unit 1 of the present invention, for performing computation when numerous particles interact due to gravitational and Coulomb forces will now be described with reference to FIG. 3. As shown in Equation (1) below, forces of interaction due to a central-force potential are computed with respect to numerous particles and the resultant forces due to the interaction are determined, to thereby make it possible to determine the subsequent positions of the particles by using motion equations. In the present embodiment, each element processor models a specific particle, and the forces from other particles (acting particles) that act on the modeled particle are sequentially summed while sequentially changing the acting particles. The computation is generally performed using floating-point computation.

$$\frac{d^2 x_i}{dt^2} = -\sum_{j \neq i} Gm_j \frac{x_j - x_i}{|x_j - x_i|^3} \quad (1)$$

In the present embodiment, first, in step S102, the host computer 20 stores data of individual particles in the external memory 2 of the dedicated computing unit 10.

Next, in step S104, the data of a particle that the element processor modeled for computation is written into the register file of the element processor. For example, suppose that the K×M element processors shown in FIG. 2 are used to perform computations on particles from a first particle to the N-th particle. In the case of N≦M, N particles are modeled by any of the M element processors. Element processors having the same number in a different group model the same particle. Data used for computation is data, such as the position, mass, or electrical charge, that is needed for particle-dependent computation. In this case, since different particle data are written into the element processors in a group, writing the particle data in such a manner corresponds, in the present invention, to the operation in which the element processors pre-store different parameters in the register files R. This writing is performed in a random access mode for writing different data for respective element processors. In the case of N>M, calculation may be shared using element processors of another semiconductor die 12 provided on the same or another adapter card or calculation in which the number of particles on which force is exerted is limited to a computable number can be repeated. These calculations are similar in principle.

Next, in step S106, the data of a particle (i.e., an acting particle) that affects the gravitational and Coulomb forces to the particle modeled by the element processor is written into the register files of the element processors in the group. In this case, the particle data of the same acting particle is written, by broadcasting, to the element processors in the same group and the particle data of a different acting particle is written to the element processors in a different group. In this case, data used for computation is data, such as the position, mass, or electrical charge, that is needed for particle-dependent computation.

For example, in the case of the processing unit 1 shown in FIG. 2, the particle data of a first acting particle is written, by broadcasting, into all the register files R of all the element processors $P_{11}$ to $P_{1M}$ in the processor group $PG_1$ and the particle data of a second acting particle is written, by broadcasting, to the element processors $P_{21}$ to $P_{2M}$ in the processor group $PG_2$. That is, the particle data is broadcast, in the same group, to the element processors to which the particle data of the same acting particle is written. This arrangement minimizes the number of memory accesses.

Since the force acting on one particle is exerted by particles other than the particle of interest, computation for an interaction between the same particles is not performed in calculation for inter-particle interaction.

In step S108, differences between the positional data (x, y, and z) of two particles are determined, the positional data being present in the register files R of the element processors. Thus, a difference $dx = x_i - x_j$ (i and j are indices of different particles) between the positional data is determined and is stored in the register file R of each element processor. Similarly, dy and dz are determined with respect to y and z. This processing involves computation using the register files R in the element processors. Thus, even when computations for the elements x, y, and z are sequentially performed, the processing is completed in three clocks. When a vector instruction that allows simultaneous subtraction of three components x, y, and z is provided, the processing is completed in one clock. The determinations of the differences are performed in parallel by element processors that operate simultaneously, so that the computation progresses very efficiently.

In step S110, the values of dx, dy, and dz are raised to the second powers, respectively, and the sum thereof is determined, so that a square (dr2) of distance is determined. In this computation, data used by each element processor is present only in the register file.

In step S112, each element processor performs the calculation of invdr3=dr2$^{-1.5}$. In this case, piecewise polynomial interpolation is performed for computing a power function. The processing unit 1 according to this embodiment of the present invention, the unit being capable of indirect-addressing based on address offset, can perform high-speed computation. The value of invdr3 determined by each element processor is stored in the corresponding register file.

In step S114, invdr3 determined in step S112 is multiplied by dx, dy, and dz determined in step S108, so that components fx, fy, and fz of force f due to the interaction are determined and stored in the register files R. Although the mass and gravitational constants or constants for electrical charge and the like are not described in the figure, those constants are also multiplied, as needed. Consequently, computational data of the force exerted on the particle, modeled by each element processor, by one acting particle is stored in the register file R of the element processor.

For each particle, all other particles act as acting particles. Thus, in step S116, the processing from step S106 to step S114 is repeated on acting particles to be subjected to computation. Consequently, the force applied by other acting particles is added to the particle modeled by the element processor and the result is stored in the register file of the element processor. During the calculation for the second and subsequent acting particles, data of a subsequent acting particle is transferred to the shared memory. With this arrangement, the computational operation and the data transfer are performed in parallel, so that the computational operation can be sped up.

Lastly, in step S118, data of force for each particle is collected in the host computer 20 while reduction across multiple groups is being performed.

With the above described computation, force due to the interaction between numerous particles can be computed and the motion of numerous moving particles can be simulated in accordance with the equations of motion. Further, the computation of the interaction may be divided into multiple computations and be performed part-by-part. This can prevent data overflow and can simultaneously process a larger number of particles than the number of operable element processors.

SECOND EXAMPLE

Computation of Matrix Product

Figure 4:
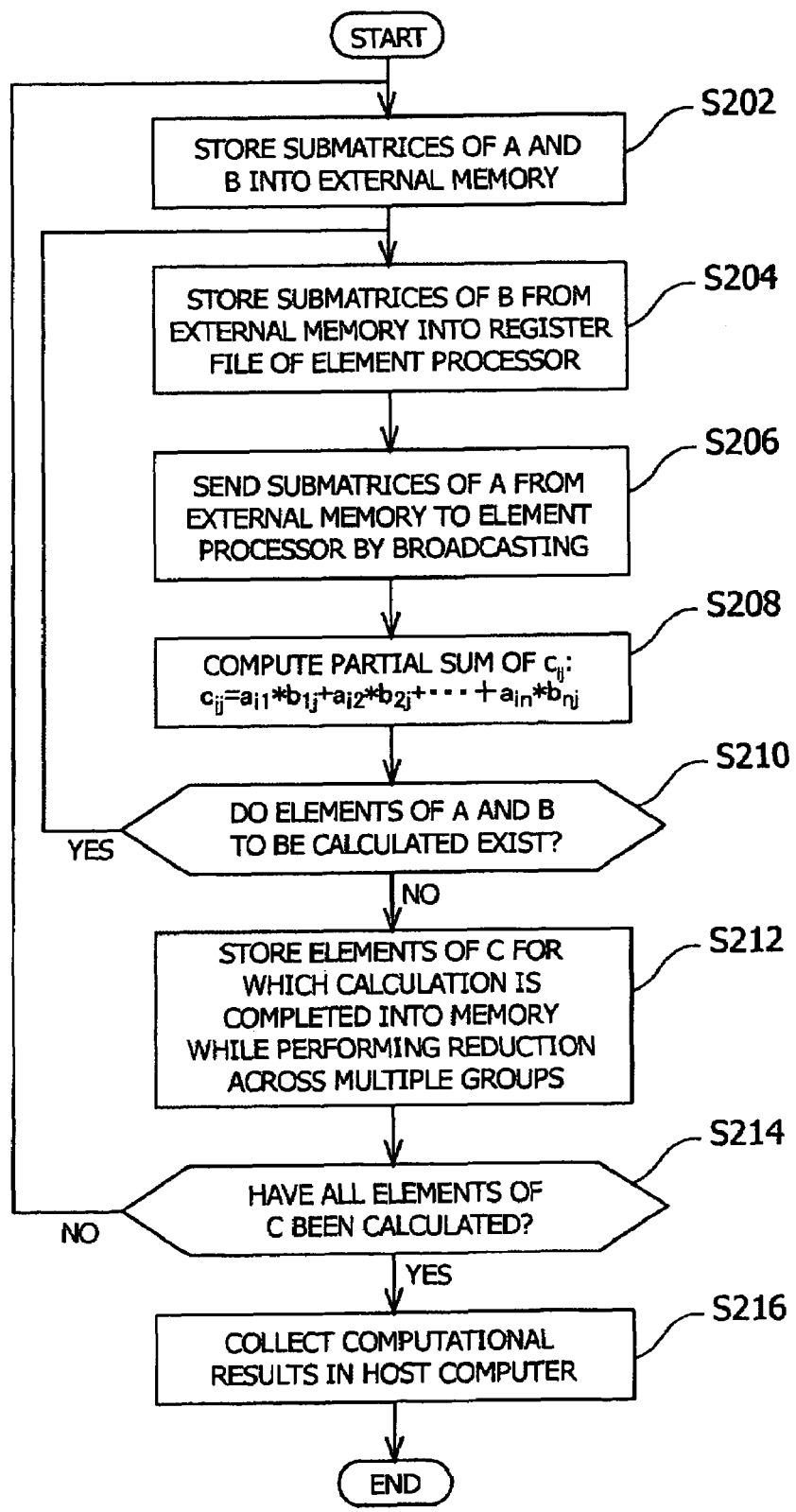
FIG. 4 is a flow chart showing processing according to a second example in the present invention.

An operation when the processing unit 1 of the present invention performs computation for determining matrix products of n×n square-matrices will now be described with reference to FIG. 4. A matrix product C of matrices A and B can be obtained by computing $c_{ij}=\Sigma_k a_{ik}b_{kj}$. In this case, $a_{ik}$, $b_{kj}$, and $c_{ij}$ indicate elements of A, B, and C, respectively. In the present embodiment, the element processor $P_{11}$ handles the computation for determining $c_{11}$ and the element processor $P_{12}$ handles the computation for determining $c_{12}$. Similarly, the element processor $P_{21}$ handles the computation for determining $C_{21}$. In this manner, the element processors $P_{11}$ to $P_{nn}$ handle the computations for determining $c_{11}$ to $C_{nn}$.

First, in step S202, the host computer 20 stores submatrices of matrices A and B into the external memory 2 of each adapter card of the dedicated computing unit 10. The submatrices of matrices A and B can be matrices A and B themselves, depending on the capacity and/or the amount of data of the external memory 2 of the adapter card.

Subsequently, in step S204, the submatrices of matrix B are stored in the register files R of the element processors. In this case, $b_{11}, b_{21}, \ldots,$ and $b_{n1}$ are stored in the register R of the element processor $P_{11}$ and $b_{12}, b_{22}, \ldots,$ and $b_{12}$ are stored in the register R of the processor $P_{12}$. In this manner, ($b_{11}$, $b_{21}, \ldots,$ and $b_{n1}$), ($b_{12}, b_{22}, \ldots,$ and $b_{n2}$), $\ldots,$ and ($b_{1n}$, $b_{2n}, \ldots,$ and $b_{nn}$) are stored in the processor group $PG_1$ so as to correspond to the element processors $P_{11}$ to $P_{1M}$.

In step S206, the submatrices of matrix A are broadcast from the external memory 2 to the element processors. In this case, data of another row are sent to a different processor group. For example, $a_{11}, a_{12}, \ldots,$ and $a_{1n}$ are sent to the element processors $P_{11}$ to $P_{1M}$ in the processor group $PG_1$, and $a_{21}, a_{22}, \ldots,$ and $a_{2n}$ are sent to the element processors $P_{21}$ to $P_{2M}$ in the processor group $PG_2$. The same data is broadcast to all the element processors in the same processor group. For this purpose, the shared register SR shown in FIG. 2 can be used or the data may be directly written, by broadcasting, to the register files R of the element processors. This arrangement minimizes the access to the external memory 2, thereby, the computational speed is not significantly affected by the restriction of the memory bandwidth.

Further, in step S208, each element processor computes a partial sum of $c_{ij}$. For example, the processor $P_{11}$ in the processor group $PG_1$ computes $a_{11}*b_{11}+a_{12}*b_{21}+\ldots+a_{1n}*b_{n1}$, and the processor $P_{21}$ in the processor group $PG_2$ computes $a_{21}*b_{11}+a_{22}*b_{21}+\ldots+a_{2n}*b_{n1}$. Since the element processors perform those computations in parallel, multiple elements are simultaneously computed. When the processing unit 1 of the present embodiment has a vector instruction that allows multiplications in parallel, multiple terms can be computed by a single instruction, thereby enhancing the processing efficiency.

In this case, for example, when the number of matrix elements is smaller than the number of element processors used for computation or when computation is not intended for products of square matrices, there is typically a need to divide the computation. In particular, for calculation of elements of C, there is a need to divide the computation. In such a case, when elements of A and B to be subjected to computation exist in step S210, the elements are read from the external memory 2 (or from the host computer 20, as needed) and the computation is continued.

After the computations of elements of C, i.e., the computations handled by the individual element processors, are completed, the elements of C are stored in the external memory 2 in step S212, while reduction across multiple groups is being performed. The above-described steps are repeated until the computations of all the elements of C are completed in step S214. Upon the completion of the computations, in step S216, the computational results are collected in the host computer 20.

While the above description has been given of a specific embodiment of the present invention, the embodiment and the examples are merely illustrative to embody the spirit of the present invention. The present invention, therefore, is not limited to the embodiment described above, and various modifications, changes, and combinations are also possible thereto without departing from the sprit and scope of the present invention.

What is claimed is:

1. A processing unit comprising:
a plurality of element processors capable of communicating with an external memory via a single memory port, each element processor having a logic unit, an arithmetic unit, and a register file for storing parameter data, and each processor performing an operation on data from the external memory and the parameter data in accordance with an instruction that is common to all element processors; and
a control processor for broadcasting the common instruction and addresses for each element processor to access the parameter data to the plurality of element processors to operate the plurality of element processors;
wherein at least two of the plurality of element processors pre-receive the parameter data to be used for the operation, wherein the parameter data in one element processor differs from the parameter data in another element processor; store the parameter data in the register files in the respective element processors; upon receiving the common instruction that has been broadcast for the operation by the control processor, read the data from the external memory via the memory port, wherein the data from the external memory is common to all element processors; and perform at least one of logic computation and arithmetic computation in accordance with the common instruction, with respect to the common data and the parameter data that differs among element processors and is stored in respective register files,
wherein the plurality of element processors are grouped into groups, each including at least two element processors and having a shared memory, and
wherein a mode for reading from the shared memories to the external memory includes a random access mode and a reading mode that involves reduction across multiple groups, a mode for writing from the external memory into the shared memories includes a mode for broadcasting to a plurality of element processors and a mode for randomly accessing and transferring to an individual element processor, and a mode for writing from the external memory into the register files includes a first broadcast mode for broadcasting to all element processors in a group and a second broadcast mode for broadcasting to element processors in multiple groups.

2. The processing unit according to claim 1, wherein a mode for writing from the external memory into the register files includes a mode for broadcasting to a plurality of element processors and a mode for randomly accessing an individual element processor, and a mode for reading from the register files to the external memory includes a mode for randomly accessing an individual element processor.

3. The processing unit according to claim 1, wherein the instruction includes a vector instruction, and a vector length of the vector instruction is arbitrarily specifiable to a value in a predetermined range.

4. The processing unit according to claim 1, wherein the processing unit is capable of performing indirect addressing using an address offset to specify addresses for the register files.

5. A processing unit comprising:
a plurality of element processors capable of communicating with an external memory via the same memory port, each element processor having a logic unit, an arithmetic unit, and a register file; and
a control processor for sending instructions and addresses to the plurality of element processors to operate the plurality of element processors;
wherein at least two of the plurality of element processors pre-receive different parameter data to be used for the operation; store the parameter data in the corresponding register files; receive the same instruction that has been broadcast, for the operation, by the control processor; read the same data from the external memory via the memory port; and perform at least one of logic computation and arithmetic computation in accordance with the same instruction, with respect to the same data and the different parameter data;
wherein the data comprises 72-bit-length floating-point-format data containing a 1-bit sign field, an 11-bit exponent field, and a 60-bit mantissa field; the instruction comprises a multiplication instruction, including a single-precision multiplication instruction and a double-precision multiplication instruction, and an addition/subtraction instruction, including a regular floating-point addition/subtraction instruction and a block floating-point addition/subtraction instruction containing a mode bit; and the arithmetic units comprise multipliers and adders;
wherein each multiplier corrects a bias of a mantissa of input data when receiving the input data; in response to the single-precision multiplication instruction, each multiplier performs a rounding operation on a computational result of a multiplication to thereby provide a 25-bit result; and in response to the double-precision multiplication instruction, each multiplier does not perform a rounding operation on a computational result of a multiplication; and
wherein, in response to the regular floating-point addition/subtraction instruction, each adder performs computation by performing a rounding operation on a computational result; and in response to the block floating-point addition/subtraction instruction, each adder performs computation by shifting, in accordance with an exponent of an input that corresponds to a source operand specified by the mode bit of inputs designated by operands of at least two floating-point data for computation, an exponent of another source operand, and does not normalize a computational result.

6. The processing unit according to claim 5, wherein at least one of the rounding operations comprises an operation of forcibly rounding to 1.

7. The processing unit according to claim 5, wherein the plurality of element processors are grouped into groups, each including at least two element processors and having a shared memory.

8. The processing unit according to claim 7, wherein a mode for reading from the shared memories to the external memory includes a random access mode and a reading mode that involves reduction across multiple groups, a mode for writing from the external memory into the shared memories includes a mode for broadcasting to a plurality of element processors and a mode for randomly accessing and transferring to an individual element processor, and a mode for writing from the external memory into the register files includes a first broadcast mode for broadcasting to all element processors in a group and a second broadcast mode for broadcasting to element processors in multiple groups.

* * * * *